(12) United States Patent
Major et al.

(10) Patent No.: US 11,685,427 B2
(45) Date of Patent: Jun. 27, 2023

(54) ELECTRIC ACTUATOR STEERING SYSTEM FOR FORKLIFTS

(71) Applicant: Toyota Material Handling, Inc., Columbus, IN (US)

(72) Inventors: Joseph Major, Indianapolis, IN (US); Kevin Partridge, Columbus, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 0 days.

(21) Appl. No.: 17/703,395

(22) Filed: Mar. 24, 2022

(65) Prior Publication Data
US 2022/0324507 A1 Oct. 13, 2022

Related U.S. Application Data

(60) Provisional application No. 63/173,695, filed on Apr. 12, 2021.

(51) Int. Cl.
*B62D 5/04* (2006.01)
*F16H 25/20* (2006.01)
*F16H 25/22* (2006.01)

(52) U.S. Cl.
CPC ......... *B62D 5/0448* (2013.01); *B62D 5/0403* (2013.01); *B62D 5/0481* (2013.01); *F16H 25/2015* (2013.01); *F16H 25/2214* (2013.01); *F16H 2025/2031* (2013.01)

(58) Field of Classification Search
CPC .. B62D 5/0448; B62D 5/0403; B62D 5/0481; B62D 55/15; F16H 25/2214; F16H 25/2015; F16H 2055/281
See application file for complete search history.

(56) References Cited

U.S. PATENT DOCUMENTS

| | | | |
|---|---|---|---|
| 4,712,027 A | 12/1987 | Karidis et al. | |
| 4,841,790 A * | 6/1989 | Williston | B62D 5/0448 180/444 |
| 5,347,458 A | 9/1994 | Serizawa et al. | |
| 5,908,457 A | 6/1999 | Higashira et al. | |
| 6,079,513 A | 6/2000 | Nishizaki et al. | |
| 6,097,286 A | 8/2000 | Discenzo | |
| 6,219,604 B1 | 4/2001 | Dilger et al. | |
| 6,370,460 B1 | 4/2002 | Kaufmann et al. | |
| 6,378,646 B1 * | 4/2002 | Bugosh | B62D 5/0427 180/444 |
| 6,535,806 B2 | 3/2003 | Millsap et al. | |
| 6,554,095 B2 | 4/2003 | Zheng et al. | |
| 6,678,595 B2 | 1/2004 | Zheng et al. | |
| 6,678,596 B2 | 1/2004 | Husain et al. | |
| 6,681,882 B2 | 1/2004 | Zheng et al. | |
| 6,687,588 B2 | 2/2004 | Demerly et al. | |
| 6,694,239 B1 | 2/2004 | Yao et al. | |
| 6,712,175 B2 | 3/2004 | Kind et al. | |
| 6,728,615 B1 | 4/2004 | Yao et al. | |

(Continued)

*Primary Examiner* — Zakaria Elahmadi
(74) *Attorney, Agent, or Firm* — Barnes & Thornburg LLP

(57) ABSTRACT

An electric actuator for a steering system is adapted to control an angle of steered wheels on a vehicle to adjust a direction of travel of the vehicle. The electric actuator includes a housing assembly, an electric motor, and an actuation unit. The housing assembly is arranged around the electric motor and the electric motor is coupled with the actuation unit and configured to cause an actuator rod of the actuation unit to move relative to the housing assembly.

18 Claims, 14 Drawing Sheets

(56) References Cited

U.S. PATENT DOCUMENTS

| | | |
|---|---|---|
| 6,751,539 B2 | 6/2004 | Uenuma et al. |
| 6,782,969 B2 | 8/2004 | Kodama et al. |
| 6,799,105 B2 | 9/2004 | Stout et al. |
| 6,799,654 B2 | 10/2004 | Menjak et al. |
| 6,801,840 B2 | 10/2004 | Kodama et al. |
| 6,843,344 B2 | 1/2005 | Kodama et al. |
| 6,871,127 B2 | 3/2005 | Dominke et al. |
| 6,886,656 B2 | 5/2005 | Fujioka et al. |
| 6,913,109 B2 | 7/2005 | Kodama et al. |
| 6,915,194 B2 | 7/2005 | Kodama et al. |
| 6,918,460 B2 | 7/2005 | Tajima et al. |
| 6,938,725 B2 | 9/2005 | Fujioka et al. |
| 6,973,989 B2 | 12/2005 | Williams |
| 7,004,278 B2 | 2/2006 | Sugitani et al. |
| 7,034,483 B2 | 4/2006 | Takahashi et al. |
| 7,130,728 B2 | 10/2006 | Suzuki |
| 7,191,864 B2 | 3/2007 | Sugitani et al. |
| 7,207,411 B2 | 4/2007 | Duits et al. |
| 7,234,563 B2 | 6/2007 | Ogawa et al. |
| 7,278,509 B2 | 10/2007 | Schroder et al. |
| 7,295,905 B2 | 11/2007 | Yao et al. |
| 7,325,644 B2 | 2/2008 | Sakai |
| 7,418,326 B2 | 8/2008 | Ogawa et al. |
| 7,558,657 B2 | 7/2009 | Manken et al. |
| 7,581,616 B2 | 9/2009 | Goto et al. |
| 7,676,309 B2 | 3/2010 | Tamaki et al. |
| 7,832,522 B2 | 11/2010 | Akuta et al. |
| 7,849,955 B2 | 12/2010 | Crabill et al. |
| 7,885,742 B2 | 2/2011 | Yamazaki et al. |
| 7,908,056 B2 | 3/2011 | Hwang |
| 8,010,254 B2 | 8/2011 | Chai et al. |
| 8,224,528 B2 | 7/2012 | Hayama et al. |
| 8,544,592 B2 | 10/2013 | Goutsu et al. |
| 8,554,415 B2 | 10/2013 | Takazato |
| 8,589,029 B2 | 11/2013 | Egenfeldt |
| 8,706,354 B2 | 4/2014 | Imamura et al. |
| 8,718,873 B2 | 5/2014 | Kushiro |
| 8,855,859 B2 | 10/2014 | Hayama |
| 8,855,862 B2 | 10/2014 | Tashiro |
| 9,050,999 B2 | 6/2015 | Kuipers et al. |
| 9,108,667 B2 | 8/2015 | Hayama et al. |
| 9,327,765 B2 | 5/2016 | Takeda |
| 9,446,792 B2 | 9/2016 | Takeda |
| 9,469,335 B2* | 10/2016 | Sato ................ B60G 7/006 |
| 9,505,428 B2 | 11/2016 | Chai et al. |
| 9,623,900 B2 | 4/2017 | Yukitake |
| 9,771,102 B2 | 9/2017 | Sakurai |
| 9,994,249 B2 | 6/2018 | Kageyama et al. |
| 10,011,297 B2 | 7/2018 | Oya et al. |
| 10,017,206 B2 | 7/2018 | Kawaguchi et al. |
| 10,272,941 B2 | 4/2019 | Sakamaki et al. |
| 10,399,597 B2 | 9/2019 | Varunjikar et al. |
| 10,414,288 B2 | 9/2019 | Mangette |
| 10,449,999 B2 | 10/2019 | During et al. |
| 10,461,606 B2* | 10/2019 | Ognibene ............ F16H 25/24 |
| 10,507,493 B2 | 12/2019 | Houston et al. |
| 2003/0230448 A1 | 12/2003 | Guldner et al. |
| 2005/0199435 A1* | 9/2005 | Perni ................ F16H 25/2204 |
| | | 180/400 |
| 2006/0200291 A1 | 9/2006 | Wroblewski |
| 2014/0353066 A1* | 12/2014 | Sato ................ B62D 5/0415 |
| | | 180/444 |
| 2015/0330497 A1 | 11/2015 | Amano et al. |
| 2018/0229989 A1 | 8/2018 | Goshima |
| 2018/0251150 A1* | 9/2018 | Ognibene ........ F16H 25/2204 |
| 2019/0118853 A1 | 4/2019 | Delmarco et al. |
| 2019/0168807 A1 | 6/2019 | Polmans |
| 2019/0176882 A1 | 6/2019 | Thompson et al. |
| 2019/0256133 A1 | 8/2019 | Tsubaki |
| 2019/0300051 A1 | 10/2019 | Inoue et al. |
| 2019/0359248 A1 | 11/2019 | Tsubaki |
| 2019/0367075 A1 | 12/2019 | Kodera |
| 2020/0023893 A1 | 1/2020 | Naik et al. |
| 2020/0023894 A1 | 1/2020 | Naik et al. |
| 2020/0047764 A1 | 2/2020 | Yamashita et al. |
| 2020/0400517 A1* | 12/2020 | Benoit ................ H02K 5/1732 |
| 2020/0406960 A1* | 12/2020 | Anetzberger ........ B60B 35/163 |
| 2021/0214006 A1* | 7/2021 | Sovern .............. B62D 15/0225 |
| 2021/0387667 A1* | 12/2021 | Ishihara .............. B62D 5/0406 |

* cited by examiner

ELECTRIC ACTUATOR STEERING SYSTEM FOR FORKLIFTS

CROSS REFERENCE TO RELATED APPLICATIONS

This application claims priority to and the benefit of U.S. Provisional Patent Application No. 63/173,695, filed 12 Apr. 2021, the disclosure of which is now expressly incorporated herein by reference.

FIELD OF THE DISCLOSURE

The present disclosure relates generally to steering systems, and more specifically to steering systems having electric actuators for turning the steered wheels of a vehicle.

BACKGROUND

Hydraulic motors and actuators are used in on and off-highway vehicles such as in the material handling, agriculture, and automotive industries. Hydraulic motors, valves, and actuators may control a variety of vehicle features such as steering, lifting, tilting, rotating, etc. The vehicles may be used to move heavy loads that are supported on a bed or lift mechanism of the vehicle.

Using hydraulics is a relatively reliable and durable way to support and move loads. However, there are some negatives associated with hydraulics. As one example, a hydraulic system may experience power loses throughout the components of the system causing the hydraulic system to lose efficiency. While most hydraulic functions, for example in a forklift, are used with an intermediate frequency, steering systems may maintain on demand power at all times during operation. This may cause hydraulic steering systems to be especially inefficient. Other negatives associated with hydraulic systems may include low resolution, multiple components using space, time consuming installation, & frequent maintenance.

Using electric actuators in vehicle steering systems may overcome some of the disadvantages of the hydraulic systems. For material handling vehicles, one such example of an electric actuator is a ball screw drive. As a result, there is a desire to develop an electric actuator having a ball screw drive that avoids the disadvantages of hydraulic actuators while being as durable, compact, and reliable as hydraulic actuators.

SUMMARY

The present disclosure may comprise one or more of the following features and combinations thereof.

According to an aspect of the disclosure, an electric actuator is adapted for use in a steering system and includes a linear actuation unit, an electric motor, and a housing assembly.

The linear actuation unit includes an actuator rod that extends along an axis between a first end and a second end of the actuator rod and a ball screw nut arranged circumferentially around the actuator rod. The electric motor is coupled with the ball screw nut and configured to rotate the ball screw nut about the axis and cause the actuator rod to translate axially relative to the ball screw nut. The housing assembly is arranged around and coupled with the electric motor. The housing assembly provides a first fixed end moment of the actuator rod on a first side of the ball screw nut and a second fixed end moment of the actuator rod on a second side of the ball screw nut to minimize deflection of a portion of the actuator rod located within the ball screw nut.

In some embodiments, the housing assembly includes a case arranged around and coupled with the electric motor and a plurality of bushings engaged with the actuator rod. The plurality of bushings are coupled with the case to facilitate translation of the actuator rod relative to the case. The plurality of bushings includes a first bushing and a second bushing spaced apart axially from the first bushing to locate the second bushing axially between the first bushing and the ball screw nut such that the first bushing and the second bushing cooperate to provide the first fixed end moment of the actuator rod.

In some embodiments, the housing assembly further includes a bearing. The bearing is coupled with the case and with the ball screw nut such that the second bushing is located axially between the first bushing and the bearing.

In some embodiments, the first bushing is entirely cylindrical and the second bushing has a cylindrical segment and a flange that extends radially away from the cylindrical segment and abuts an axial-facing surface of the case. The case includes a body arranged around the first bushing and the second bushing and a lip that extends radially inward from the body. The lip is located axially between the first bushing and the second bushing and engages the first bushing to axially locate the first bushing.

In some embodiments, the actuator rod includes a cylindrical rod and ball return insert. The cylindrical rod includes a threaded portion that provides a helical race that receives a plurality of balls. The cylindrical rod is further formed to define a cutout that extends radially into the threaded portion. The ball return insert is received in the cutout and configured to recirculate the plurality of balls in the helical race.

In some embodiments, the ball return insert is formed to include threads. The threads of the ball return insert have a diameter that is less than a diameter of threads in the threaded portion of the actuator rod to cause a subset of the plurality of balls that are circumferentially and axially aligned with the ball return insert to be spaced apart radially from the ball screw nut.

In some embodiments, the electric motor includes stator windings and permanent magnets. The stator windings are fixed to a case included in the housing assembly. The permanent magnets are coupled directly with the ball screw nut for rotation with the ball screw nut.

In some embodiments, the actuator rod has a threaded portion, a first unthreaded portion that extends axially away from the threaded portion, and a second unthreaded portion that extends axially away from the threaded portion opposite the first unthreaded portion. An outer surface of the actuator rod is provided with a continuous surface treatment that extends along the first unthreaded portion, the threaded portion, and the second unthreaded portion.

In some embodiments, the case is formed to define an annular channel that opens radially inward toward the ball screw nut. The case further includes a sensor located in the annular channel and configured to measure a rotational position of the ball screw nut. The sensor including a position target board coupled to the ball screw nut for rotation therewith and an arcuate sensor board coupled with the case and located adjacent the position target board such that the arcuate sensor board overlaps the position target board when viewed along the axis.

In some embodiments, the housing assembly includes a case having a body arranged around and coupled with the electric motor and a first stop flange configured to limit axial translation of the actuator rod. The body is formed to define a first opening. The actuator rod extends through the body such that the first end of the actuator rod extends out of the body through the first opening. The first stop flange extends axially away from the body beyond the first opening and is configured to block the first end of the actuator rod from being pushed into the body in response to an external force being applied to the actuator rod.

In some embodiments, the body is formed to define a second opening spaced apart axially from the first opening. The second end of the actuator rod extends axially out of the body through the second opening. The case includes a second stop flange that extends axially away from the body beyond the second opening.

In some embodiments, the case includes a second stop flange that extends axially away from the body beyond the first opening. The second stop flange is spaced apart circumferentially from the first stop flange.

According to another aspect of the present disclosure, an actuator includes a linear actuation unit, an electric motor, and a housing assembly. The linear actuation unit includes an actuator rod that extends along an axis and a ball screw nut arranged circumferentially around the actuator rod. The electric motor is coupled with the ball screw nut. The housing assembly includes a case, a first bushing, and a second bushing. The case is arranged around and coupled with the electric motor. The first bushing is arranged circumferentially around and engaged with the actuator rod. The second bushing is arranged circumferentially around and engaged with the actuator rod. The first bushing and the second bushing are coupled to the case. The second busing is spaced apart axially from the first bushing to locate the second bushing axially between the first bushing and the ball screw nut.

In some embodiments, the first bushing is entirely cylindrical. The second bushing has a cylindrical segment and a flange that extends radially away from the cylindrical segment and abuts an axial-facing surface of the case.

In some embodiments, the case includes a body arranged around the first bushing and the second bushing and a lip that extends radially inward from the body. The lip is located axially between the first bushing and the second bushing and engages the first bushing to axially locate the first bushing relative to the axis.

In some embodiments, the housing assembly further includes a bearing. The bearing is coupled with the case and with the ball screw nut to locate the second bushing axially between the first bushing and the bearing.

According to another aspect of the disclosure, a method includes a number of steps. The method includes coupling a first bushing to a case, coupling a second bushing to the case to cause the second busing to be spaced apart axially from the first bushing relative to an axis, inserting an actuator rod into a ball screw nut, engaging the first bushing with the actuator rod so that the first bushing is arranged circumferentially around the actuator rod, and engaging the second bushing with the actuator rod so that the second bushing is arranged circumferentially around the actuator rod and located axially between the first bushing and the ball screw nut.

In some embodiments, the method includes applying an external force to an end of the actuator rod and counteracting the external force with the first bushing and the second bushing. The external force has a radial direction component.

In some embodiments, the method includes engaging the first bushing with a lip that extends radially inward from a body of the case to locate the first bushing axially relative to the axis. In some embodiments, the method includes rotating the ball screw nut to cause the actuator rod to slide axially on the first bushing and the second bushing.

According to another aspect of the present disclosure, an electric actuator includes a linear actuation unit, an electric motor, and a case. The linear actuation unit includes an actuator rod, a ball screw nut, and a first tie rod assembly. The actuator rod extends along an axis between a first end and a second end of the actuator rod. The ball screw nut arranged circumferentially around the actuator rod. The first tie rod assembly coupled to the first end of the actuator rod for movement with the first end of the actuator rod. The electric motor is coupled with the ball screw nut and configured to rotate the ball screw nut about the axis and cause the actuator rod to translate axially relative to the ball screw nut. The case includes a body arranged around and coupled with the electric motor and a first stop flange configured to limit axial translation of the actuator rod. The body is formed to define a first opening. The actuator rod extends through the body such that the first end of the actuator rod extends out of the body through the first opening. The first stop flange extends axially away from the body beyond the first opening and is configured to engage one of the first end of the actuator rod and the first tie rod assembly to block the first end of the actuator rod from being pushed into the body in response to an external force being applied to the actuator rod.

In some embodiments, the body is formed to define a second opening spaced apart axially from the first opening. The second end of the actuator rod extends axially out of the body through the second opening. The case includes a second stop flange that extends axially away from the body beyond the second opening.

In some embodiments, the first stop flange is formed to define a depression that extends axially into the first stop flange and shaped to engage the one of the first end of the actuator rod and the first tie rod assembly. In some embodiments, the case includes a second stop flange that extends axially away from the body beyond the first opening and the second stop flange is spaced apart circumferentially from the first stop flange.

In some embodiments, the electric actuator further includes a controller connected to the electric motor for controlling movement of the actuator rod via the electric motor. The controller programmed to block the electric motor from moving the first end of the actuator rod at a predetermined location. The predetermined location is selected such that the one of the first end of the actuator rod and the first tie rod assembly are spaced apart from the first stop flange.

According to another aspect of the present disclosure, an electric actuator includes housing assembly, an electric motor, and a linear actuation unit. The electric motor located in the housing assembly. The linear actuation unit includes an actuator rod, a ball screw nut, a plurality of balls, and a ball return insert. The actuator rod extends along an axis and includes a threaded portion that defines a first helical race. The ball screw nut is coupled to the electric motor and extends circumferentially around the actuator rod and defines a second helical race. The plurality of balls located in the first helical race and the second helical race. The ball return insert is received in a cutout defined in the actuator rod and configured to recirculate the plurality of balls in the first helical race.

In some embodiments, a subset of the plurality of balls which are circumferentially and axially aligned with the ball return insert engage directly the ball return insert and are spaced apart radially from the ball screw nut. In some embodiments, the ball return insert defines a plurality of recirculation races and each of the plurality of recirculation races has a diameter that is less than a diameter of a helical race defined in the actuator rod.

These and other features of the present disclosure will become more apparent from the following description of the illustrative embodiments.

DETAILED DESCRIPTION OF THE DRAWINGS

Figure 1:
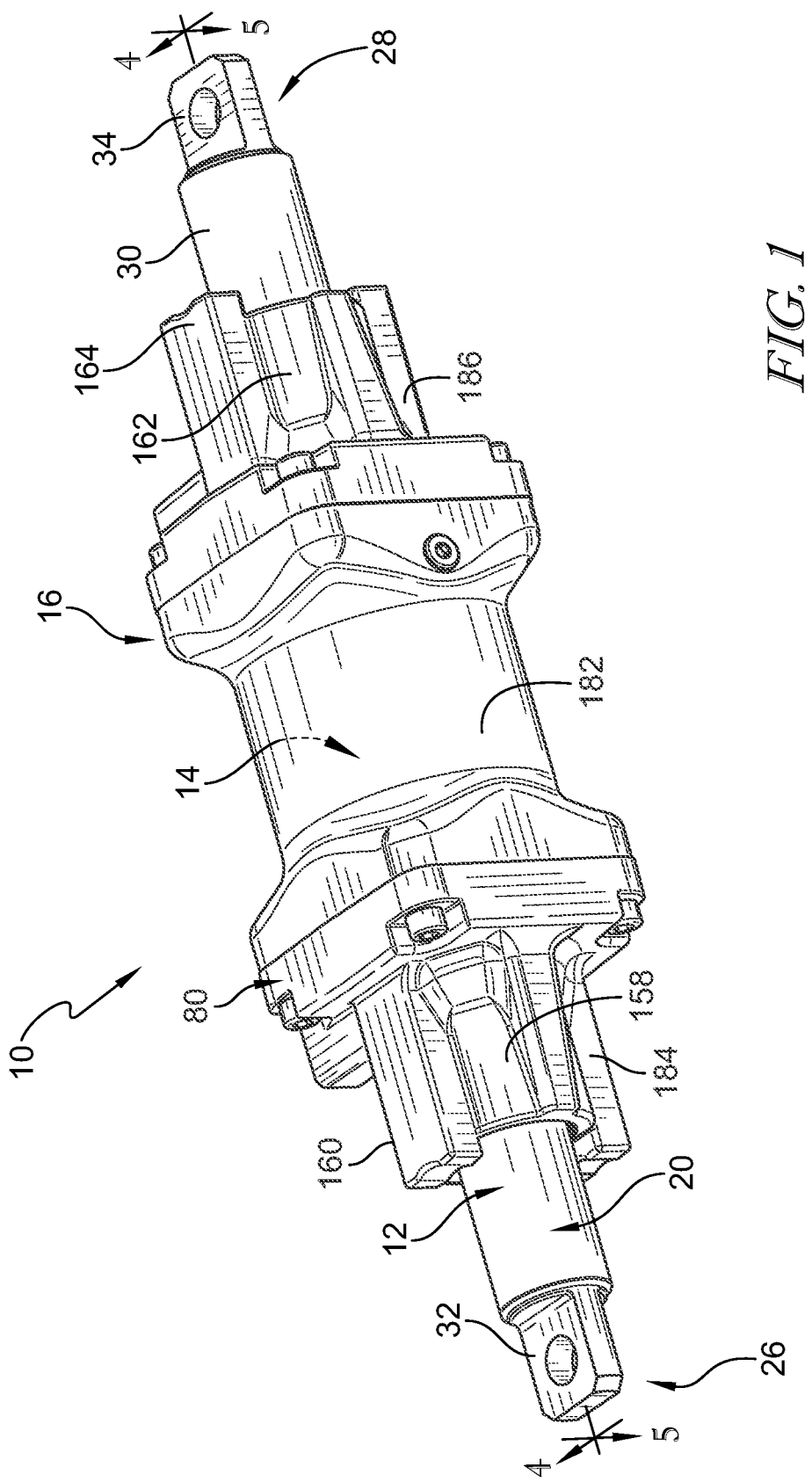
FIG. 1 is a perspective view of an electric actuator in accordance with the present disclosure, the electric actuator being adapted for use in a vehicle steering system such as a forklift steering system to adjust an angle of the steered wheels of the vehicle.

For the purposes of promoting an understanding of the principles of the disclosure, reference will now be made to a number of illustrative embodiments illustrated in the drawings and specific language will be used to describe the same.

An electric actuator 10 in accordance with the present disclosure is shown in FIG. 1. As suggested in FIG. 2, the electric actuator 10 is adapted for use in a steering system 112 of a vehicle 110 such as, for example, a forklift. The electric actuator 10 is configured to control an angle of steered wheels 114 included in the vehicle 110 to adjust a direction of travel of the vehicle 110.

The electric actuator 10 includes linear actuation unit 12, an electric motor 14, and a housing assembly 16 as shown in FIGS. 1 and 3-5. The housing assembly 16 is arranged around the electric motor 14 and also arranged around a portion of the linear actuation unit 12. The electric motor 14 is coupled with the linear actuation unit 12 and configured to cause an actuator rod 20 of the linear actuation unit 12 to move relative to the housing assembly 16.

Figure 2:
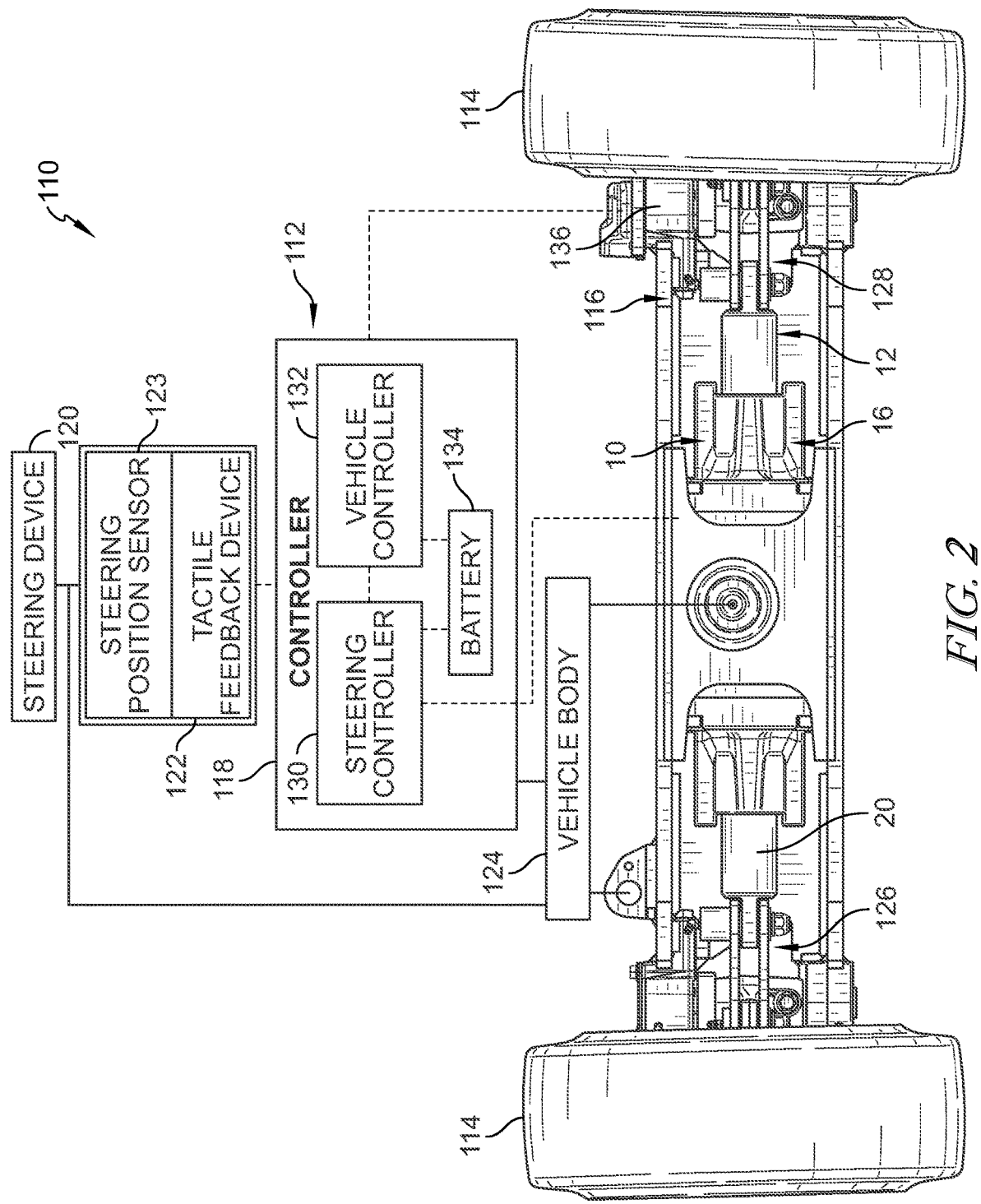
FIG. 2 is a diagrammatic and perspective view of a vehicle having the electric actuator of FIG. 1 incorporated in the steering system of the vehicle.

The vehicle 110 includes, among other things, the steering system 112 and a vehicle body 124 as shown in FIG. 2. The steering system 112 illustratively includes the electric actuator 10, steered wheels 114, an actuator mount 116, a controller 118, and a steering input system that includes a steering device 120, a tactile feedback device 122, and a steering position sensor 123 as shown in FIG. 2. The electric actuator 10 is connected to the steered wheels 114 via tie rod assemblies 126, 128 that are coupled to the actuator mount 116. The actuator mount 116 is coupled to the vehicle body 124 for movement with the vehicle body 124. The controller 118 is coupled with the vehicle body 124 and electrically connected with the electric actuator 10 to control the electric actuator 10. The tactile feedback device 122 is coupled with the steering device 120 and with the vehicle body 124 and connected to the controller 118. The steering position sensor 123 is configured to detect a position of the steering device 120 and generate a signal indicative of the position.

The controller 118 illustratively includes a steering controller 130, a vehicle controller 132, and a battery 134 as shown in FIG. 2. The steering controller 130 is configured for controlling the steered wheels 114 based on input received from the steering device 120 and the vehicle controller 132. The vehicle controller 132 controls other aspects of the vehicle 110 and receives data from a tire angle position sensor 136. Among other uses of the tire position sensor data, the vehicle controller 132 transmits the tire position sensor data to the steering controller 130. The battery 134 is electrically connected to the steering controller 130 and the vehicle controller 132. The steering controller 130 is configured to regulate the flow of electric energy from the battery 134 to the electric actuator 10 for powering movement of the electric actuator 10. Electrical connections are depicted as broken lines in FIG. 2. Each of the steering controller 130 and the vehicle controller 132 include a memory and a processor configured to execute instructions stored on the memory. In other embodiments, the controller 118 may include a single processor and memory instead of the two controllers 130, 132.

The tactile feedback device 122 is configured to apply resistance forces to the steering device 120 to provide tactile feedback to the operator of the vehicle 110. Illustratively, the tactile feedback device 122 includes a magnet suspended in a magnetic fluid and the controller 118 is configured to energize a magnetic field in the tactile feedback device 122 to cause the magnet to resist rotation and therefore apply the resistance force to the steering device 120. In other embodiments, the tactile feedback device 122 may include an actuator such as a linear actuator. In some embodiments, the tactile feedback device 122 is omitted and the steering device 120 is connected directly with the controller 118.

The steering position sensor 123 is configured to detect a position of the steering device 120. Illustratively, the position sensor 123 is an encoder configured to detect a rotational position of a steering wheel 120. In the illustrative embodiment, the steering position sensor 123 is integrated with the tactile feedback device 122. In other embodiments, the steering position sensor 123 is integrated with the steering device 120.

The steering device 120 may comprise a steering wheel, joystick, knob, rocker switch, etc. The tactile feedback device 122 may comprise a stepper motor, a brushless DC motor, an electromagnetic brake, a constant resistance bearing arrangement etc.

The electric actuator 10 includes the linear actuation unit 12, the electric motor 14, and the housing assembly 16 and as shown in FIGS. 1 and 3-5. The linear actuation unit 12 is coupled with the steered wheels 114 and is configured to translate relative to the housing assembly 16 to cause a change in the angle of the steered wheels 114 in response to an input from the operator of the vehicle 110 via steering device 120. The electric motor 14 is coupled to the linear actuation unit 12 and the controller 118 and configured to translate selectively the actuator rod 20 included in the linear actuation unit 12. The housing assembly 16 is arranged around the electric motor 14 and assists in the movement of the linear actuation unit 12.

Figure 3:
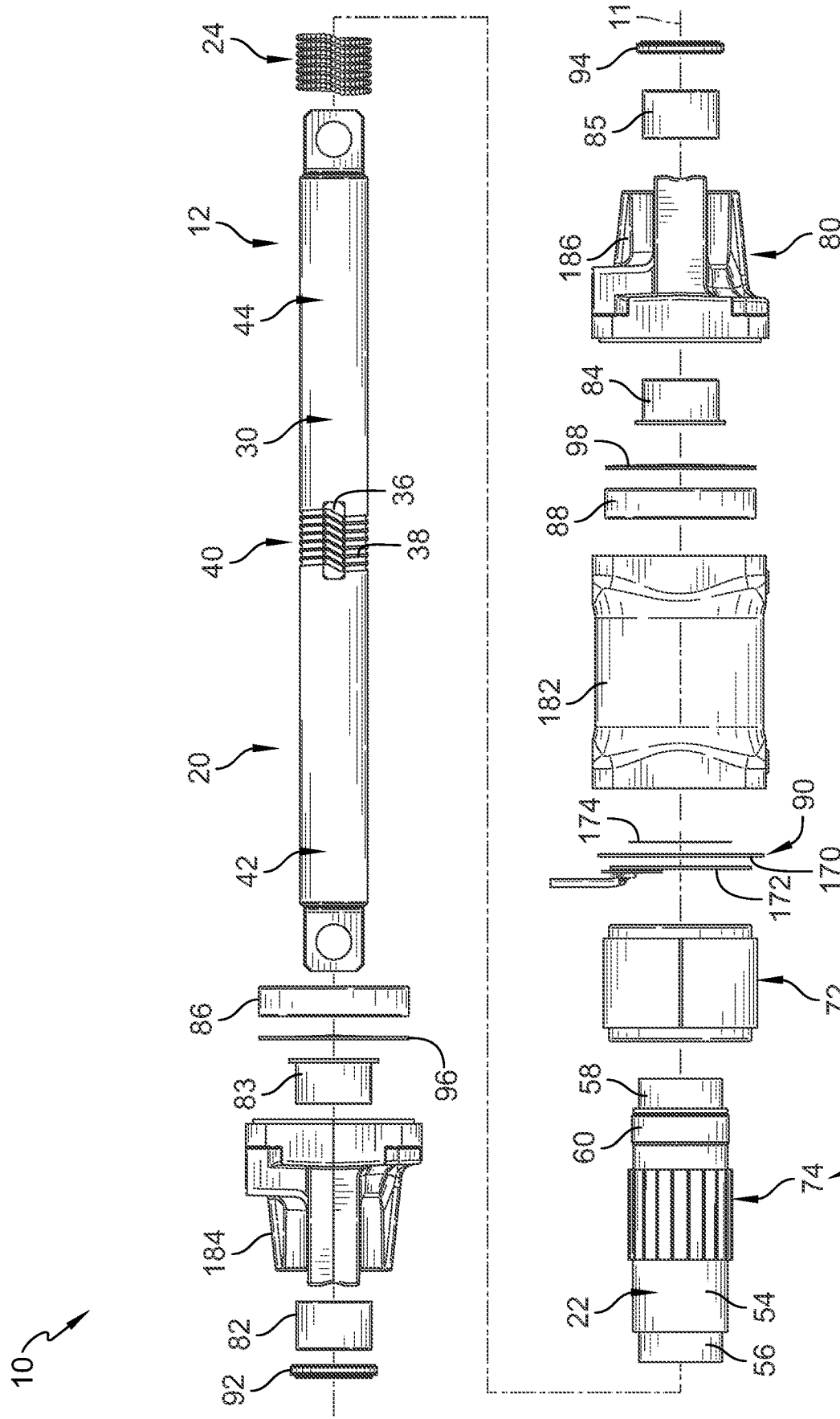
FIG. 3 is an exploded view of the electric actuator of FIG. 1 showing that the electric actuator includes, from top left to bottom right, a seal, a first bushing, a first end cap of a housing assembly, a second bushing, a Belleville washer, a bearing, an actuator rod, a plurality of balls, an electric motor having a rotor integrated with a ball screw nut and a stator, a rotational position sensor, a motor mount of the housing assembly, another bearing, another Belleville washer, a third bushing, a second end cap of the housing assembly, a fourth bushing, and another seal.
Figure 4:
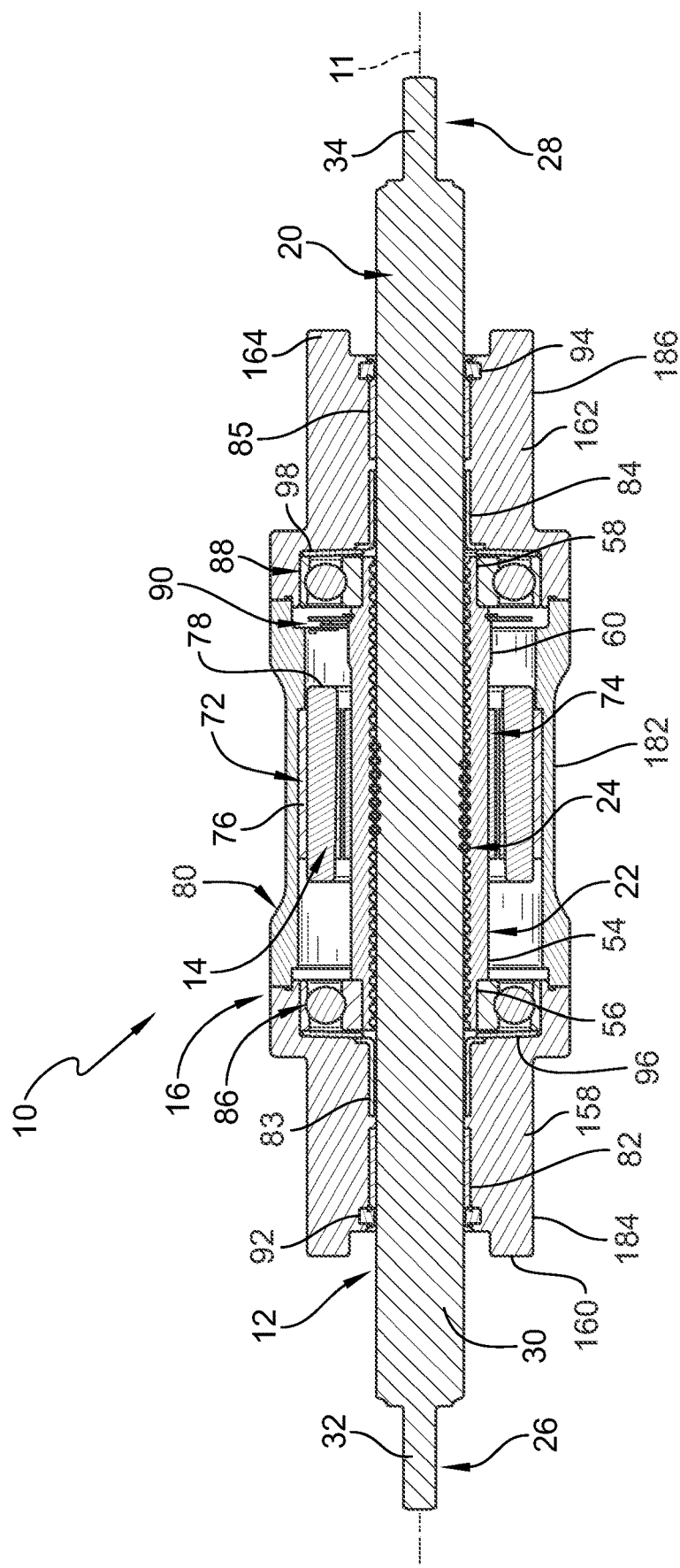
FIG. 4 is a section view of the electric actuator taken along line 4-4 of FIG. 1.
Figure 5:
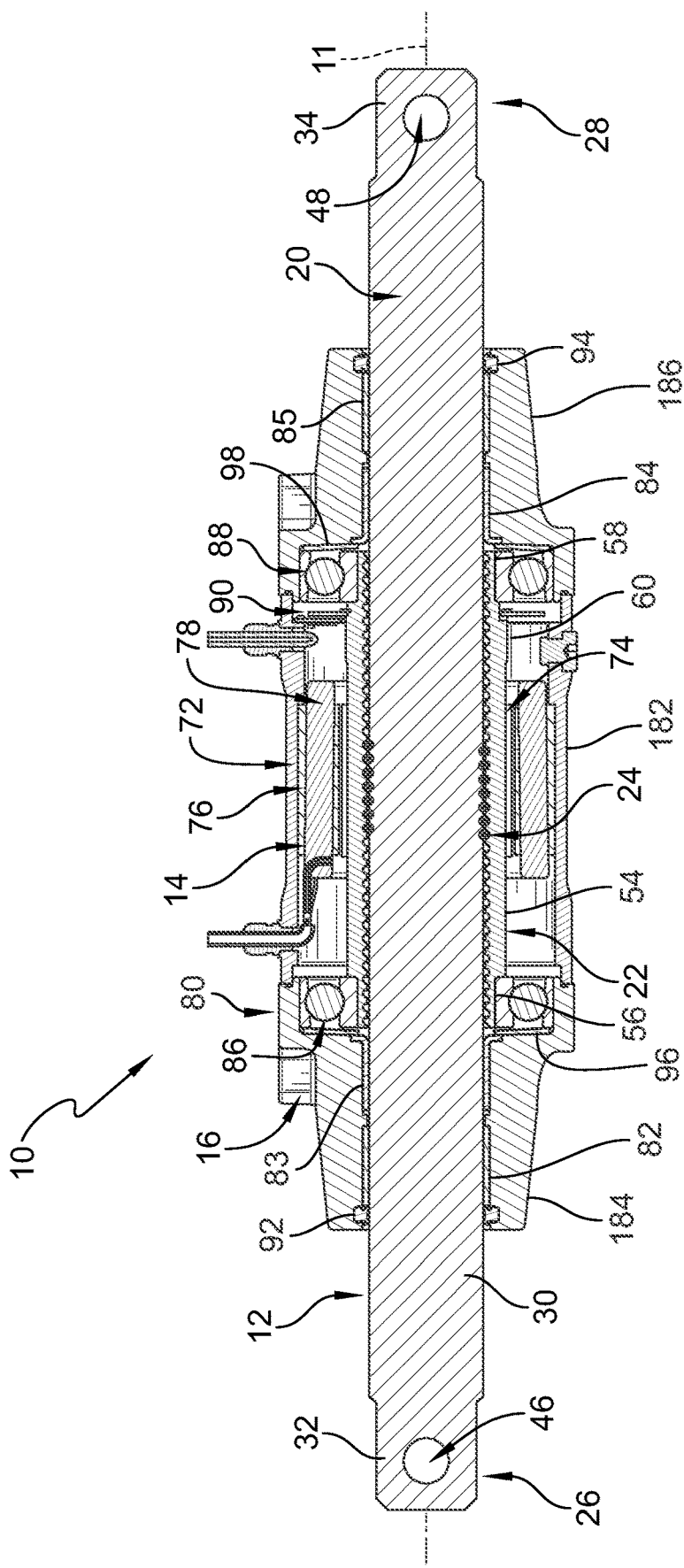
FIG. 5 is a section view of the electric actuator taken along line 5-5 of FIG. 1.

The linear actuation unit 12 includes the actuator rod 20, the ball screw nut 22, and a plurality of balls 24 as shown in FIGS. 3-5. The actuator rod 20 extends along an axis 11 between a first end 26 and a second end 28 of the actuator rod 20. The first end 26 and the second end 28 of the actuator rod 20 are coupled with tie rod assemblies 126, 128 and configured to move the tie rod assemblies 126, 128 to change the angle of the steered wheels 114 in response to translation of the actuator rod 20. The ball screw nut 22 is arranged circumferentially around the actuator rod 20 and configured to convert rotation of the ball screw nut 22 into linear translation of the actuator rod 20. The plurality of balls 24 are located radially between the actuator rod 20 and the ball screw nut 22 and transmit forces from the ball screw nut 22 to the actuator rod 20 to move the actuator rod 20.

The actuator rod 20 includes a cylindrical rod 30 and a ball return insert 36 as shown in FIGS. 3-5 and 10-12. The cylindrical rod 30 extends along the axis 11 through and beyond the electric motor 14 and housing assembly 16. The ball return insert 36 is received in the cylindrical rod 30 and is configured to maintain the plurality of balls 24 in a threaded portion 40 of the actuator rod 20.

Figure 10:
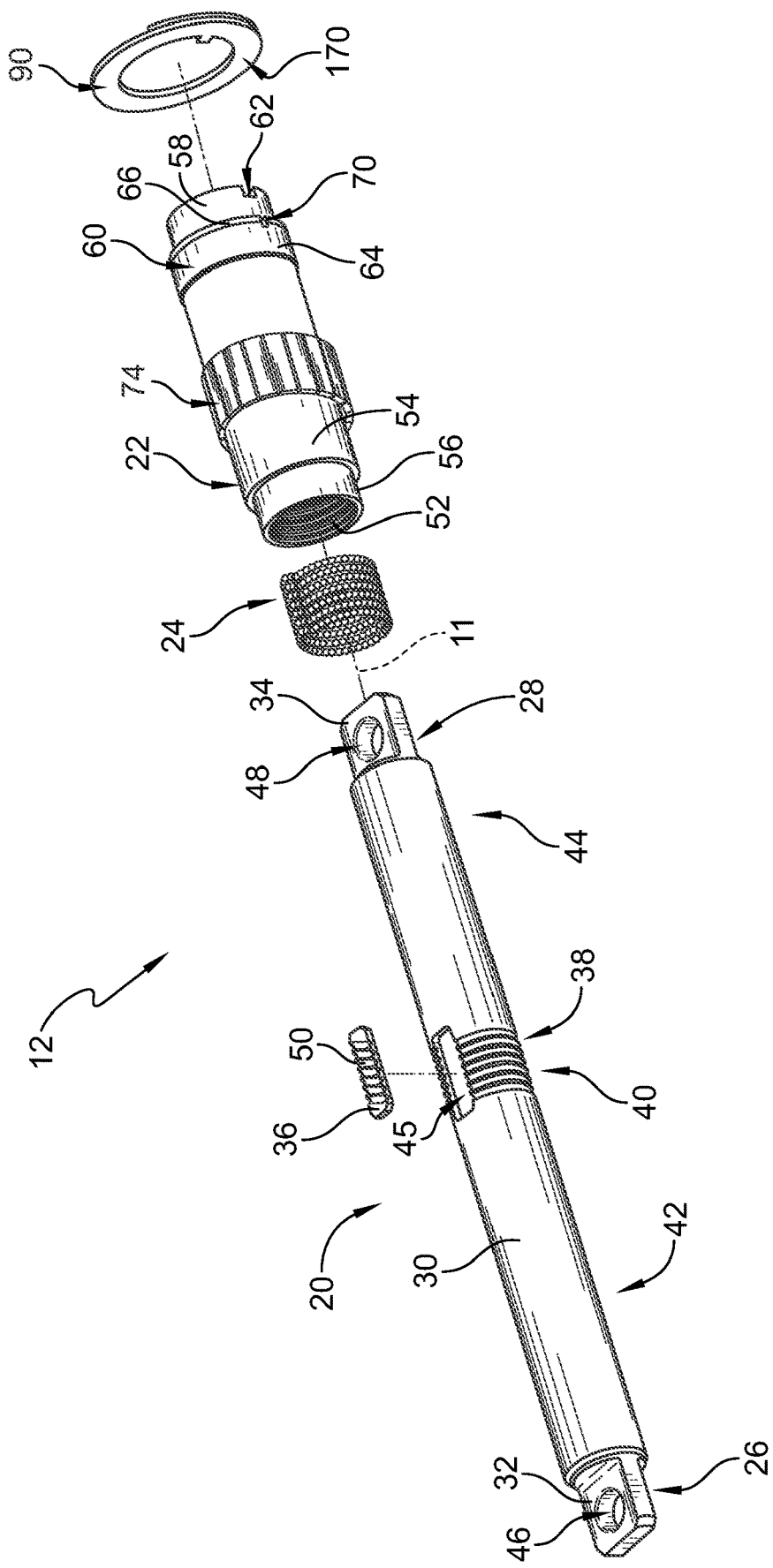
FIG. 10 is an exploded view of the actuator rod and the ball screw nut showing that the actuator rod includes a cylindrical body having a threaded portion for receiving a plurality of balls therein and a removable ball return insert for recirculating the plurality of balls within the threaded portion.

The actuator rod 20 has a threaded portion 40, a first unthreaded portion 42 that extends axially away from the threaded portion 40, and a second unthreaded portion 44 that extends axially away from the threaded portion 40 opposite the first unthreaded portion 42 as shown in FIG. 10. The threaded portion 40 defines a helical race. In some embodiments, an outer surface of the actuator rod 20 is provided with a continuous surface treatment that extends continuously along the first unthreaded portion 42, the threaded portion 40, and the second unthreaded portion 44. In some embodiments, the outer surface of the actuator rod 20 is provided with a first surface treatment that extends continuously along the threaded portion 40 and a second surface treatment that extends along the first unthreaded portion 42 and the second unthreaded portion 44.

Figure 12:
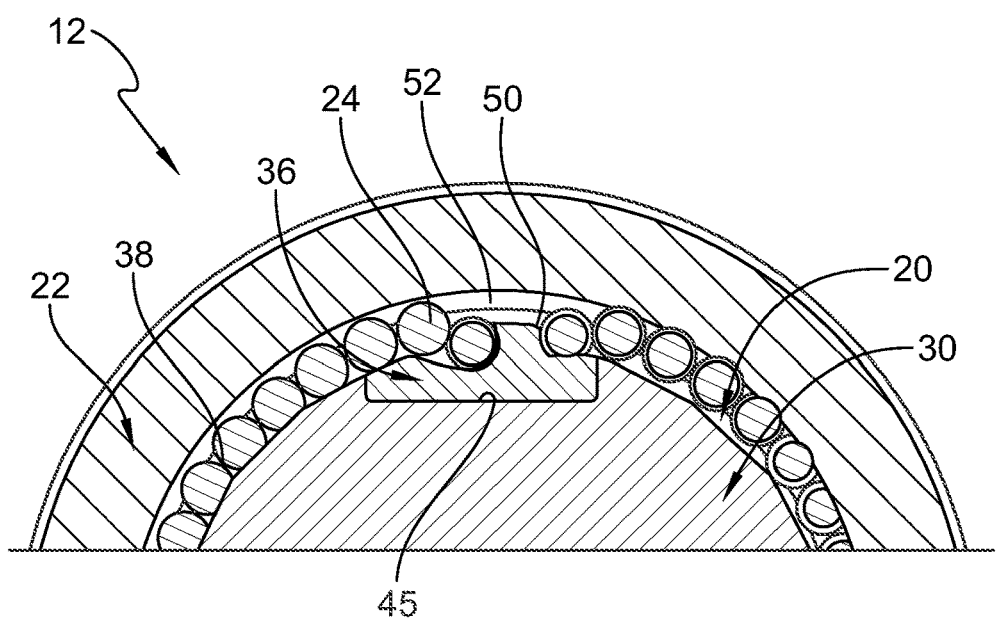
FIG. 12 is cutaway and section view of the actuator rod and ball screw nut showing the plurality of balls in the threaded portion of the actuator rod and showing that the plurality of balls move radially inward as they pass through the ball return insert which allows the plurality of balls to move axially relative to the ball screw nut so as to be recirculated.

The cylindrical rod 30 is formed to include a plurality of threads 38 that define the threaded portion 40 of the actuator rod 20 as shown in FIGS. 3 and 10. In the illustrative embodiment, the plurality of threads 38 are formed by removing material from the cylindrical rod 30 such that the threads 38 are recessed. The threaded portion 40 of the actuator rod 20 defines a helical race configured to conduct the plurality of balls 24 around the cylindrical rod 30 in a helical path. The threads 38 are formed about midway axially along the cylindrical rod 30. The threaded portion 40 of the actuator rod 20 extends axially only partway along the cylindrical rod 30. The threads 38 have an inner diameter as shown in FIG. 12. The first inner diameter is selected along with a diameter of threads 52 included in the ball screw nut 22 to cause the plurality of balls 24 to engage the cylindrical rod 30 and the ball screw nut 22.

Figure 11:
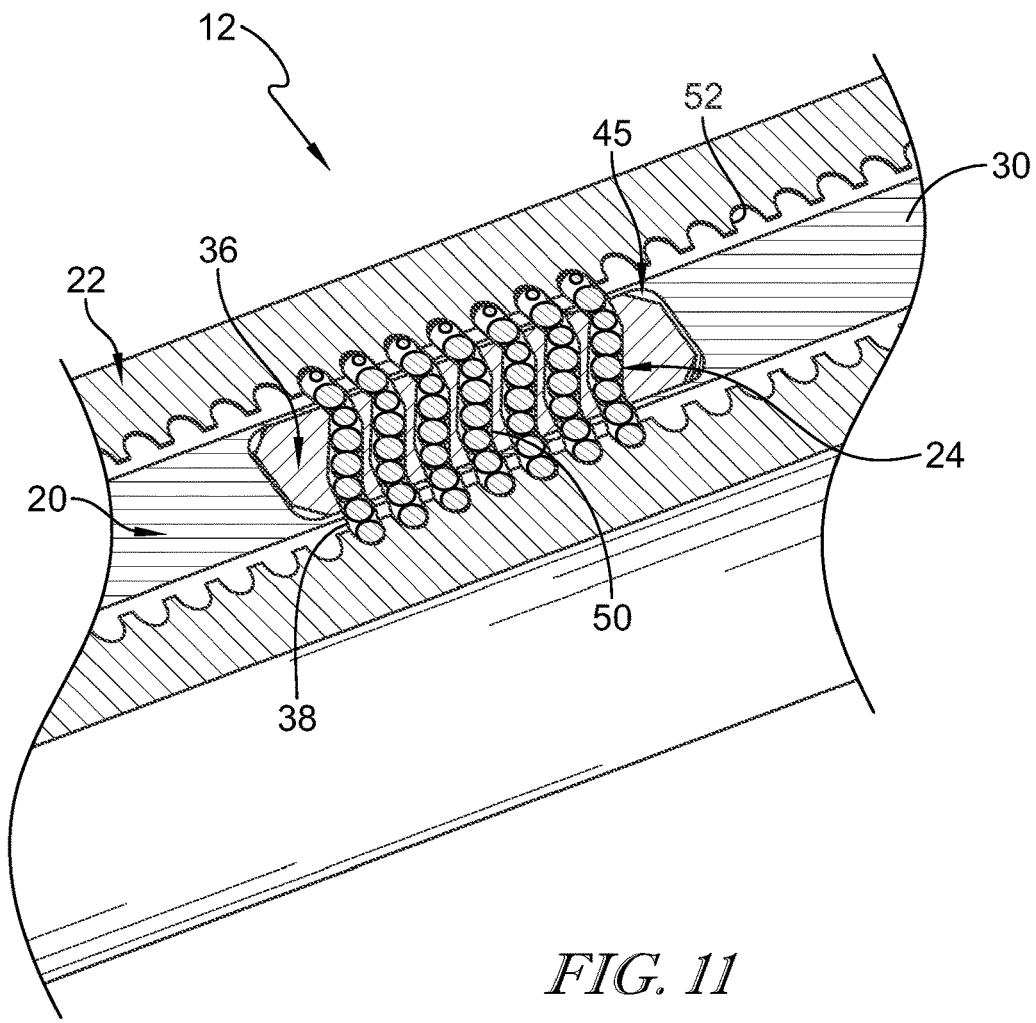
FIG. 11 is an enlarged partial section view of the actuator rod and ball screw nut showing the ball return insert received in a cutout of the body of the actuator rod and suggesting that the ball return is shaped to move the plurality of balls axially to recirculate the plurality of balls in the threads.

The cylindrical rod 30 is further formed to define a cutout 45 that extends radially inward into the cylindrical rod 30 as shown in FIGS. 10-12. The cutout 45 is shaped to receive the ball return insert 36 therein. The cutout 45 interrupts the plurality of threads 38 formed in the cylindrical rod 30. The cutout 45 is elongated in the axial direction and extends axially beyond opposing ends of the threaded portion 40 of the actuator rod 20. In the illustrative embodiment, the cutout 45 is generally rectangular shape when viewed radially.

Figure 6:
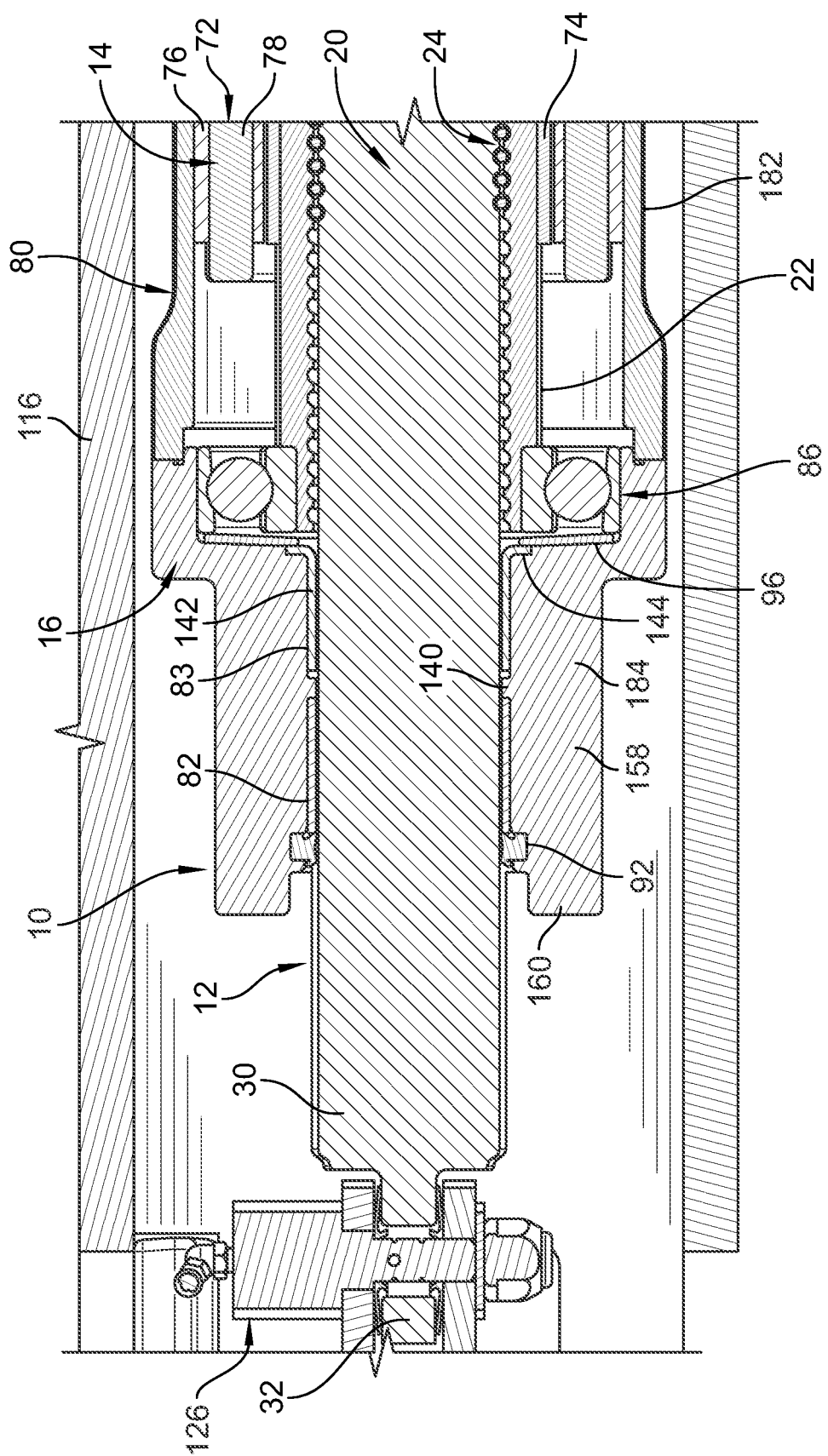
FIG. 6 is an enlarged section view of a first end of the electric actuator as assembled in the steering system and showing that the housing assembly includes, among other things, a bearing and two bushings located axially outside of the bearing to provide a fixed end moment at the first end of the electric actuator.
Figure 7:
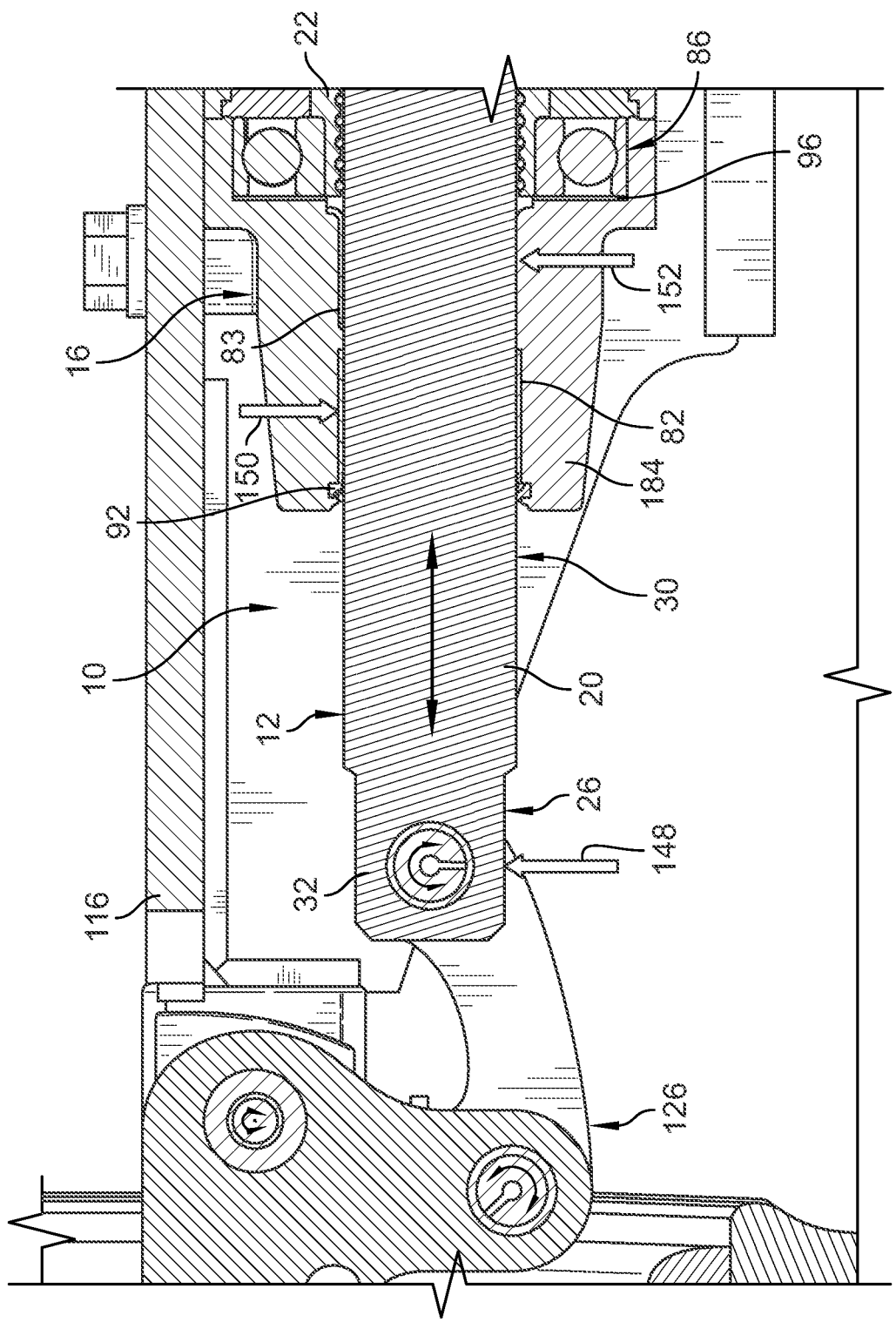
FIG. 7 is an enlarged top section view of the first end of the electric actuator and steering system suggesting that a tie rod assembly connecting the actuator to one of the steered wheels applies a force normal to the actuator axis to the actuator rod when moving the steered wheel and that the two bushings cooperate to counteract the force to provide the fixed end moment which reduces deflection of the portion of the actuator rod located within the ball screw nut so that a desired range of contact angle on the plurality of balls in the ball screw nut is maintained and the allowable stroke length and life of the electric actuator is maximized.

The cylindrical rod 30 includes a first connection flange 32 at the first end 26 of the actuator rod 20 and a second connection flange 34 at the second end 28 of the actuator rod 20 as shown in FIGS. 3-5. The first connection flange 32 is pivotably coupled with the tie rod assembly 126 as shown in FIGS. 2, 6, and 7. The second connection flange 34 is pivotably coupled with the second tie rod assembly 128. In the illustrative embodiment, the first connection flange 32 and the second connection flange 34 are generally rectangular cuboid shaped as shown in FIGS. 3-5. The first connection flange 32 is formed to define a hole 46 that extends through the first connection flange 32. The second connection flange 34 is formed to define a hole 48 that extends through the second connection flange 34.

The ball return insert 36 is formed to include threads 50 that define a plurality of recirculation races as shown in FIGS. 10-12. The threads 50 have an inner diameter that is less than the inner diameter of the threads 38 defined in the cylindrical rod 30. The smaller diameter threads 50 allow the plurality of balls 24 supported by the ball return insert 36 to be spaced apart from the ball screw nut 22 as suggested in FIG. 12. As such, the balls 24 can be urged axially back into a previous race of the threaded portion 40 for recirculation.

Each of the threads 50 have an inlet and an outlet spaced apart axially from the inlet as shown in FIG. 11. The threads 50 correspond with and align with the threads 38 so that balls 24 in any of the threads 38 are recirculated to their corresponding race in the threaded portion 40.

In some embodiments, the ball return insert 36 is fixed to the cylindrical rod 30. In some embodiments, the ball return insert 36 is removably coupled with the cylindrical rod 30. The ball return insert 36 allows the cylindrical rod 30 to be formed with the threads 38 and then the cutout 45 machined out of the cylindrical rod 30. The ball return insert 36 having the recirculation threads 50 can then be inserted into the cylindrical rod 30. This approach may ease manufacturing and complexity as compared to machining recirculation threads directly onto the cylindrical rod 30 or using a conventional recirculation system.

The ball screw nut 22 is formed to define internal threads 52 that define a helical race as shown in FIGS. 4, 5, and 10-12. The threads 52 extend an entire axial length of the ball screw nut 22 in the illustrative embodiment. The threads 52 have a substantially consistent diameter.

The ball screw nut 22 has a midsection 54, a first end section 56, a second end section 58, and a sensor land 60 as shown in FIGS. 3-5, 10, and 12-15. The midsection 54 has a first diameter. The first end section 56 extends axially away from the midsection 54 and has a second diameter that is less than the first diameter of the midsection 54. The sensor land 60 extends axially away from the midsection 54 opposite the first end section 56 and has a third diameter that is greater than the first diameter. The second end section 58 extends axially away from the sensor land 60 to locate the sensor land 60 axially between the midsection 54 and the second end section 58. The second end section 58 has the second diameter same as the first end section 56. The second end section 58 is formed to include a slot 62 that extends axially inward partway into the second end section 58 toward the midsection 54.

Figure 15:
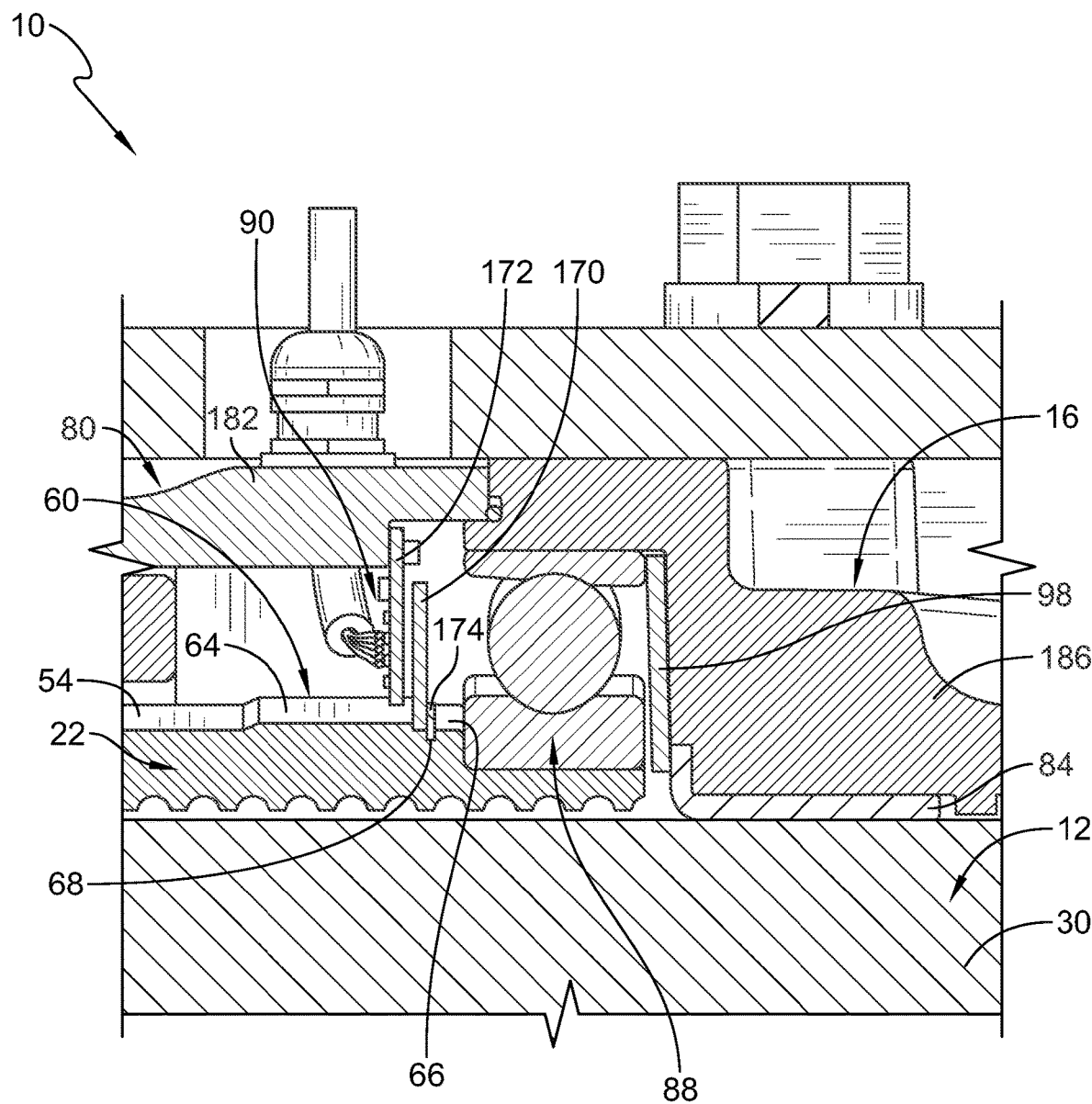
FIG. 15 is an enlarged section view of the electric actuator showing the encoded annular board portion of the rotational position sensor coupled to the ball screw nut and the wedge shaped reader board located adjacent the encoded annular board and coupled to the housing.

The sensor land 60 includes an outer band 64, a sensor track 66, a retainer ring slot 68, and an anti-rotation slot 70 as shown in FIGS. 10 and 15. The outer band 64 extends from the midsection 54 and has the third diameter. The outer band 64 includes an axial facing surface that engages the annular position target board 170 of the position sensor 90. The sensor track 66 extends axially away from the outer band 64 and has a fourth diameter that is less than the third diameter and greater than the second diameter. The sensor track 66 is configured to support a position target board 170 of the position sensor 90 thereon. The retainer ring slot 68 extends radially into the sensor track 66 and receives a retainer ring 174 that engages the annular position target board 170 to block axial movement of the position target board 170 relative to the ball screw nut 22. The anti-rotation slot 70 extends axially into the sensor track 66 and receives tabs on the position target board 170 and the retainer ring 174 to block circumferential movement of the position target board 170 relative to the ball screw nut 22. As such, the position target board 170 rotates with the ball screw nut 22 about the axis 11.

The plurality of balls 24 are located in the helical races of the threaded portion 40, the threaded portion 52 of the ball screw nut 22, and in the threads 50 of the ball return insert 36 as shown in FIGS. 3-5. The plurality of balls 24 are configured to convert the rotational movement of the ball screw nut 22 into axial translation of the actuator rod 20 as the balls 24 move around the helical races. Each of the plurality of balls 24 are spherical as suggested in FIGS. 3 and 8. Each of the plurality of balls 24 have substantially a same diameter as all others of the plurality of balls 24.

The electric motor 14 includes a stator 72 and a plurality of magnets 74 as shown in FIGS. 3-5. The stator 72 is configured to produce a magnetic field and the plurality of magnets 74 are configured to cause the ball screw nut 22 to rotate in response to the alternating magnetic field. The electric motor 14 is aligned axially with the threaded portion 40 of the actuator rod 20 in the illustrative embodiment. In other embodiments, the electric motor 14 is axially offset from the threaded portion 40. The electric motor 14 is electrically connected with the controller 18.

The stator 72 includes a core 76 of laminations and windings 78 that extend circumferentially around the axis 11 and are coupled with the core 76 as shown in FIGS. 4 and 5. The core 76 is an annular component that is fixed to the case 80 of the housing assembly 16 for movement with the case 80 and the vehicle 110. The stator 72 includes stator windings fixed to the case 80.

The plurality of magnets 74 are located radially inward of and axially aligned with the stator 72 as shown in FIGS. 4 and 5. The plurality of magnets 74 are coupled to an outer surface of the outer band 64 for rotation with the ball screw nut 22. In the illustrative embodiment, the plurality of magnets 74 are fixed directly to the ball screw nut 22 and the magnets 74 and ball screw nut 22 cooperate to form a rotating rotor component. In other embodiments, the plurality of magnets 74 are coupled to another component such as a sleeve (not shown) which is coupled to the ball screw nut 22. In the illustrative embodiment, the plurality of magnets 74 are permanent magnets.

Each of the plurality of magnets 74 are wedge shaped when viewed axially in the illustrative embodiment. Each of the plurality of magnets 74 are spaced apart circumferentially from an adjacent magnet 74. The plurality of magnets 74 are spaced apart radially from the stator 72 to form a gap. The gap may allow lubrication inside the electric actuator 10 to pass between the magnets 74 and the stator 72.

The housing assembly 16 includes, among other things, a case 80, a plurality of bushings 82, 83, 84, 85, a plurality of bearings 86, 88, a position sensor 90, seals 92, 94, and Belleville washers 96, 98 as shown in FIGS. 3-5. The case 80 houses the electric motor 14, a portion of the linear actuation unit 12, and the remaining components of the housing assembly 16. The plurality of bushings 82, 83, 84, 85 facilitate sliding movement of the actuator rod 20 relative to the housing assembly 16 and provide fixed moment ends for the electric actuator 10 as discussed in further detail below. The plurality of bearings 86, 88 facilitate rotation of the ball screw nut 22 included in the electric motor 14. The seals 92, 94 are arranged around the cylindrical rod 30 and engage the case 80 to block lubrication from exiting the housing assembly 16 and form dirt and other debris from entering the housing assembly 16. The Belleville washers 96, 98 engage the bearings 86, 88 and help with bearing load.

The case 80 illustratively includes a motor mount 182, an end cap 186, and an end cap 186 as shown in FIGS. 3-5. The electric motor 14 is coupled with the motor mount 182. The bearing 86 is coupled with the end cap 184 and with the ball screw nut 22 such that the second bushing 83 is located axially between the bearing 86 and the first bushing 82. The bearing 88 is coupled with the end cap 186 and the ball screw nut 22 such that the third bushing 84 is located axially between the bearing 88 and the fourth bushing 85. The Belleville washer 96 is located and engaged between the bearing 86 and the end cap 184. The Belleville washer 98 is located and engaged between the bearing 88 and the end cap 186. The seal 92 is located in a groove formed in the end cap 184. The seal 94 is located in a groove formed in the end cap 186.

The bushings include the first bushing 82, second bushing 83, third bushing 84, and fourth bushing 85 as shown in FIGS. 3-5. The fourth bushing 85 is substantially similar to the first bushing 82 and the third bushing 84 is substantially the same as the second bushing 83. The first bushing 82 and the second bushing 83 cooperate to provide the first fixed end moment. The third bushing 84 and the fourth bushing 85 cooperate to provide the second fixed end moment.

The first bushing 82 is entirely cylindrical in the illustrative embodiment as shown in FIGS. 6 and 7. The first bushing 82 has an outer surface that is engaged with the first end cap 184 of the case 80 and an inner surface that is engaged with the cylindrical rod 30. The first bushing 82 further has an axial end face that engages a lip 140 of a body of the first end cap 184 that extends radially inward and located axially between the first bushing 82 and the second bushing 83. The first bushing 82 is axially located by engagement with the seal 92 and the lip 140.

The second bushing 83 has a cylindrical segment 142 and a flange 144 that extends radially away from the cylindrical segment 142 and abuts an axial-facing surface of the case 80 as shown in FIG. 6. The Belleville washer 96 engages the flange 144. The second bushing 83 includes an outer surface that engages the first end cap 184 of the case 80 and an inner surface that engages the cylindrical rod 30.

The first bushing 82 is spaced apart axially from the second bushing 83 so that the second bushing 83 is located axially between the first bushing 82 and the bearing 86 as shown in FIGS. 6 and 7. During operation of the electric actuator 10 moving the actuator rod 20, the tie rod assembly 126 will apply an axial force and a radial force 148 (perpendicular to axis 11) to the first end 26 of the cylindrical rod 30 as suggested in FIG. 7 because the steered wheel 114 resists the movement and rotation of the tie rod assembly 126. The radial force 148 may be a radial component of a force vector acting on the cylindrical rod 30. The radial force 148 is typically not present in other electric actuator applications because electric actuators are often used in applications having only axial forces.

Figure 8:
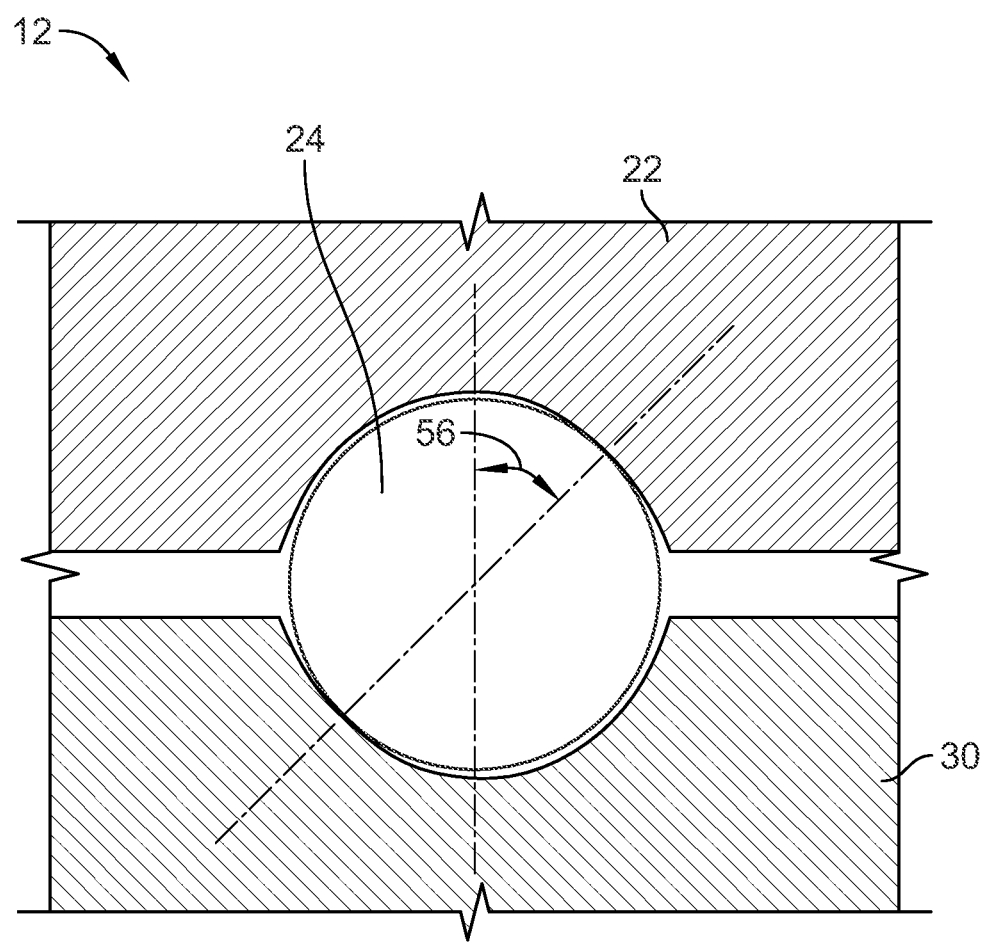
FIG. 8 is an enlarged section view of the actuator rod, one of the plurality of balls, and the ball screw nut showing how each of the plurality of balls engages the actuator rod and the ball screw nut at a contact angle to transfer the rotational movement of the ball screw nut into linear movement of the actuator rod.

Each of the plurality of balls 24 engage the ball screw nut 22 and the cylindrical rod 30 at a contact angle 156 as shown in FIG. 8. It is desired to maintain the contact angle 156 within a predefined range to prevent the electric actuator 10 from locking up and to maintain the life of the components. Balls 24 and other components may be rated for a given life or a life expectancy can be calculated if the contact angle 156 is maintained with the predefined range. However, the life of the components may be unknowable or even instantly fail if the contact angle 156 moves outside of the predefined range.

Deflection such as bending of the cylindrical rod 30 can change the contact angle 156 and can cause the contact angle to move outside of the predetermined range. A combination of the radial force 148 and a stroke of the cylindrical rod 30 affect the amount that the cylindrical rod 30 wants to deflect. The first bushing 82 counteracts the force 148 with a force 150 and the second bushing 83 provides an additional force 152 that together provide the fixed end moment at the first end 26 of the cylindrical rod 30.

The fixed end moment reduces or eliminates the amount of deflection experienced by the cylindrical rod 30 axially beyond the second bushing 83. Thus, the portion of the cylindrical rod 30 located within the ball screw nut 22 has reduced or no bending. By reducing the deflection of the cylindrical rod 30 with the fixed end moment, the electric actuator 10 may be able to receive greater radial forces 148 from the tie rod assembly 126 and/or increase the stroke of the cylindrical rod 30 which, in turn, allows for greater turning angles of the steered wheels 114.

Without the second bushing 83 being present and located axially between the first bushing 82 and the ball screw nut 22 (here by being located ahead of the bearing 86), the force 152 would be supplied by another component and typically would be supplied by a bushing located on the opposite side of the ball screw nut 22 in conventional electric actuators. Such spacing of counterforces in conventional electric actuators causes the cylindrical rod to bend and deflect through the ball screw nut in conventional electric actuators. The second end 28 of the actuator rod 20 along with the third bushing 84, fourth bushing 85, and tie rod assembly 128 functions similar to the first end 26.

Figure 9:
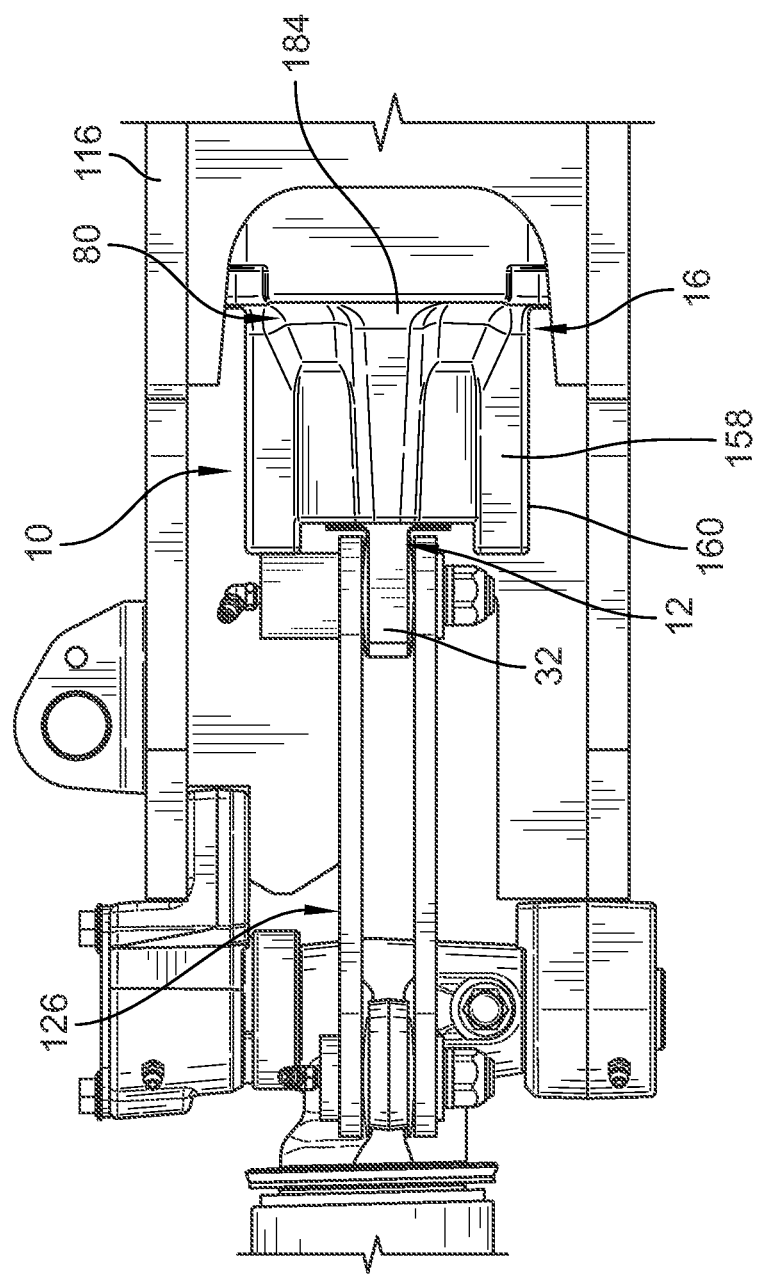
FIG. 9 is an enlarged elevation view of the first end of the electric actuator as assembled in the steering system showing the actuator rod coupled with the tie rod assembly and further showing that the case includes a body and a stop flange that extends axially away from the body and engages the tie rod assembly to block the actuator rod from being pushed fully into the case by an external force.

The first end cap 184 of the case 80 has the body 158 arranged around and coupled with the electric motor 14 and a first stop flange 160 configured to limit axial translation of the actuator rod 20 as suggested in FIG. 9. The body 158 is formed to define a first opening and the actuator rod 20 extends through the body 158 such that the first end 26 of the actuator rod 20 extends out of the body 158 through the first opening. The first stop flange 160 extends axially away from the body 158 beyond the first opening and is configured to block the first end 26 of the actuator rod 20 from being pushed into the body 158 in response to an external force being applied to the actuator rod 20. The external force may be a force applied to the steered wheels 114 which moves the tie rod assemblies 126, 128. The first stop flange 160 is illustratively arranged to engage and block movement of the tie rod assembly 126 which, in turn, blocks axial movement of the cylindrical rod 30. The first stop flange 160 includes a curved depression that matches a contour of the tie rod assembly 126 component as suggested in FIGS. 1, 3, and 9. Illustratively, the case 80 includes another stop flange that extends axially away from the body 158 beyond the first opening the another stop flange is spaced apart circumferentially from the first stop flange 160 as shown in FIGS. 1, 3, and 9.

The second end cap 186 includes a body 162 that is formed to define a second opening spaced apart axially from the first opening as suggested in FIGS. 4 and 5. The second end 28 of the actuator rod 20 extends axially out of the body 162 through the second opening. The case 80 includes a second stop flange 164 that extends axially away from the body 162 beyond the second opening. The second end cap 186 further includes another stop flange located circumferentially spaced apart from the second stop flange 164.

The controller 118 is programmed to stop the electric motor 14 from moving the actuator rod 20 too far and, thus, stop the tie rod assemblies 126, 128 from engaging the stop flanges of the case 80. The controller 118 is programmed to block movement of the actuator rod 20 at a predetermined location for each end of the stroke of the actuator rod 20 and the predetermined location is selected such that the first end 26, second end 28 of the actuator rod 20 and/or tie rod assemblies 126, 128 are spaced apart from the stop flanges. Though the controller 118 blocks the electric motor 14 from moving the actuator rod 20 to cause engagement of the stop flanges, the external force could overcome the internal resistance of the ball screw nut 22, etc. and push the actuator rod 20 into the case 80 and cause one of the tie rod assemblies to engage the respective stop flange.

The position sensor 90 is coupled with the ball screw nut 22 and the case 80 as shown in FIGS. 4, 5, and 13-15. The position sensor 90 is configured to determine a rotational position of the ball screw nut 22 which allows the controller 118 to calculate an axial location of the actuator rod 20 relative to the case 80 or electric motor 14. In some embodiments, the controller 118 further calculates the axial location of the actuator rod 20 using data from a linear position sensor such as a proximity sensor in the housing assembly 16 or using the tire angle position sensor 136.

Figure 13:
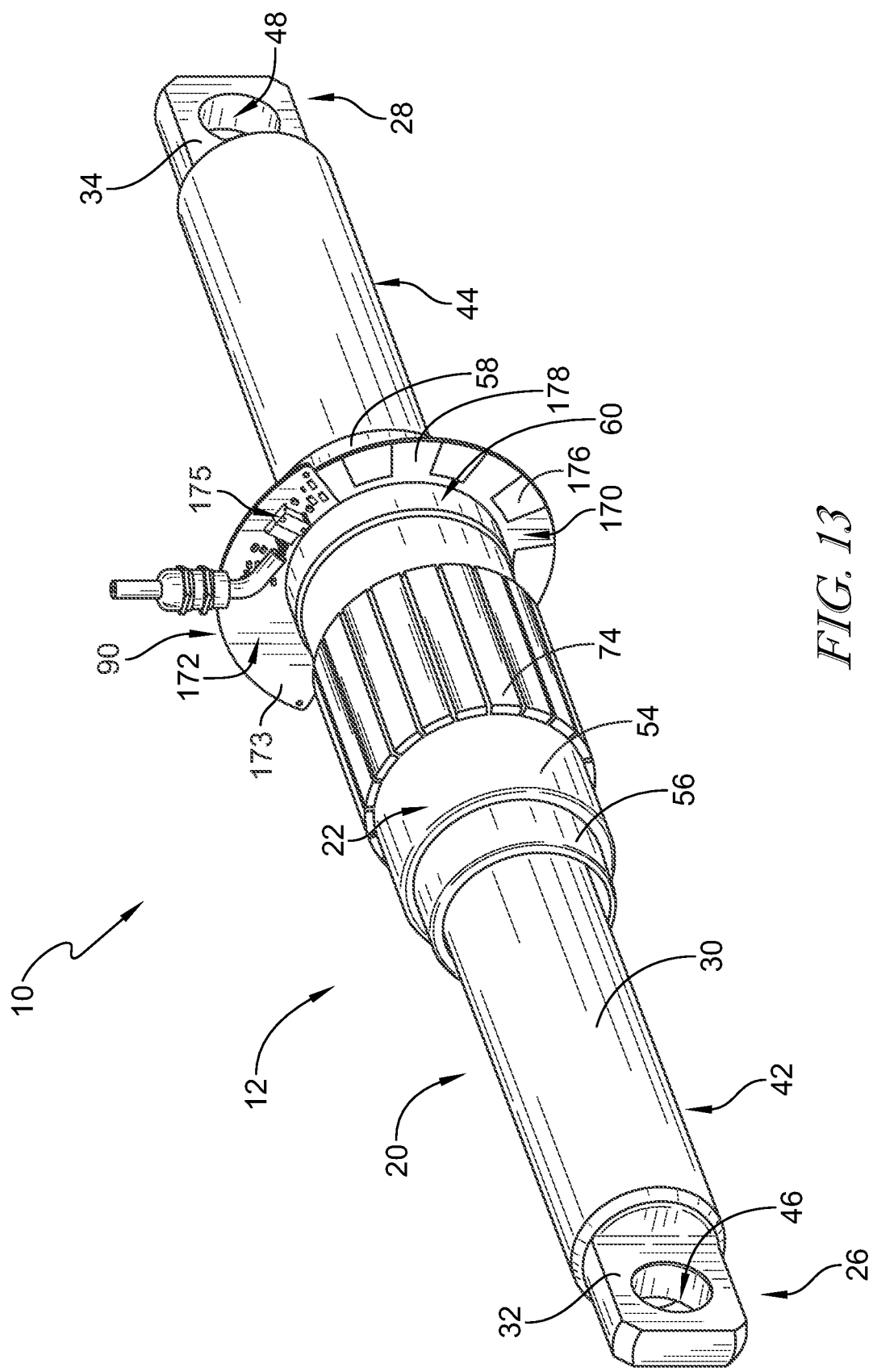
FIG. 13 is a perspective view of the actuator rod, ball screw nut, and rotational position sensor included in the electric actuator showing that the sensor includes an encoded annular board coupled with the ball screw nut for rotation therewith and a wedge shaped reader board located axially adjacent the annular board and configured to read the encoded annular board to determine a rotational position of the ball screw nut.
Figure 14:
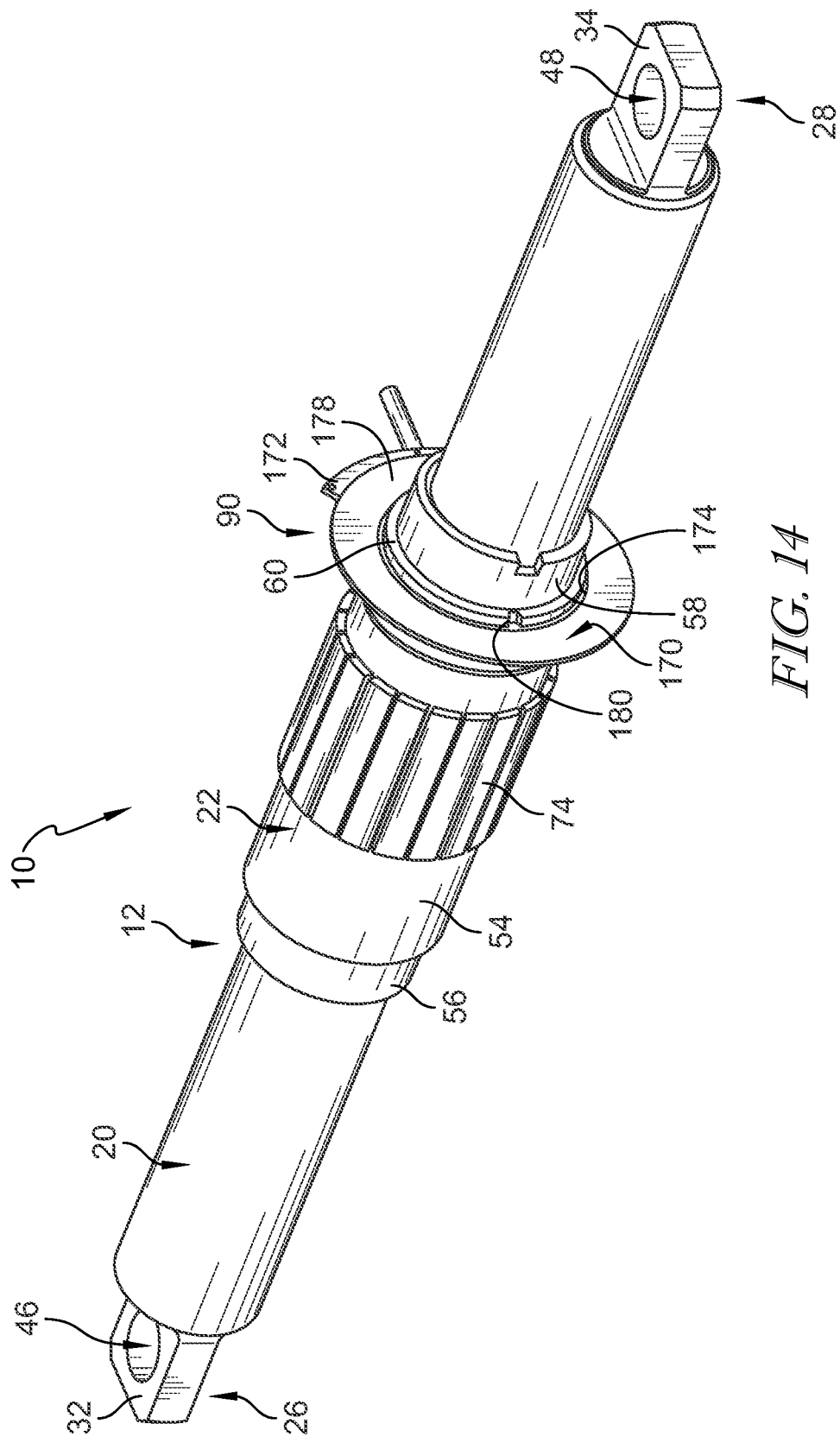
FIG. 14 is a perspective view of the actuator rod, ball screw nut, and rotational position sensor included in the electric actuator at an orientation opposite of that in FIG. 13 to show how the sensor coupled with the ball screw nut.

The position sensor 90 includes the position target board 170, the arcuate sensor board 172, and a retainer ring 174 as shown in FIGS. 13-15. The position target board 170 extends fully around the axis 11 and is coupled with the ball screw nut 22 for rotation with the ball screw nut 22. The arcuate sensor board 172 is located axially adjacent the position target board 170 and is fixed with the case 80. The arcuate sensor board 172 illustratively extends only partway around the axis 11. The retainer ring 174 is located in the retainer ring slot 68 and blocks axial movement of the position target board 170.

The position target board 170 has a circular body 178 and an anti-rotation tab 180 that extends radially inward from the circular body 178 as shown in FIG. 14. The anti-rotation tab 180 extends into the anti-rotation slot 70 formed in the ball screw nut 22 to block rotation of the position target board 170 relative to the ball screw nut 22. The position target board 170 further includes a plurality of conductive targets 176 on the body 178 as shown in FIG. 13. The targets 176 are spaced apart from one another circumferentially.

The arcuate sensor board 172 includes a body 173 and electronics 175 coupled with the body 173 as shown in FIG. 13. The arcuate sensor board 172 is located axially adjacent the position target board 170 and the electronics 175 are configured to detect the conductive targets 176 as they move circumferentially past the electronics 175 during rotation of the ball screw nut 22. The arcuate sensor board 172 is connected with the steering controller 130 and configured to transmit data indicative of the rotational position of the ball screw nut 22 to the steering controller 130 based on the location and/or movement of the conductive targets 176.

The motor mount 182 and the second end cap 183 of the case 80 are formed to define an annular channel that opens radially inward toward the ball screw nut 22 as shown in FIG. 15. The position sensor 90 is located in the annular channel. The arcuate sensor board 172 is coupled with the motor mount 182 of the case 80 and located adjacent the position target board 170 such that the arcuate sensor board 172 overlaps the position target board 170 when viewed along the axis 11. Illustratively, the arcuate sensor board 172 is coupled to an axially facing surface of the motor mount 182 with a fastener and extends radially inward from the motor mount 182.

Illustratively, the controller 118 is configured to use the data from the position sensor 90 to determine a relative position of the cylindrical rod 30. In the illustrative embodiment, the controller 118 is configured to use the data from the position sensor 90 to determine an angle of the ball screw nut 22 relative to the arcuate sensor board 172. As a result, the controller 118 is able to determine one of a finite plurality of axial locations of the cylindrical rod 30 based on the angle of the ball screw nut 22. The controller 118 uses the data from the tire angle position sensor 136 to determine a baseline position of the actuator rod 20 at startup of the controller 118. The controller 118 then uses the relative angle change of the ball screw nut 22 based on the position sensor 90 and the baseline position to control the axial position of the cylindrical rod 30, a calculated tire angle, or other calculated measurements.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric actuator for a steering system, the electric actuator comprising
   a linear actuation unit that includes an actuator rod that extends along an axis between a first end and a second end of the actuator rod and a ball screw nut arranged circumferentially around the actuator rod,
   an electric motor coupled with the ball screw nut and configured to rotate the ball screw nut about the axis and cause the actuator rod to translate axially relative to the ball screw nut, and
   a housing assembly arranged around and coupled with the electric motor and wherein the housing assembly provides a first fixed end moment of the actuator rod on a first side of the ball screw nut and a second fixed end moment of the actuator rod on a second side of the ball screw nut to minimize deflection of a portion of the actuator rod located within the ball screw nut,
   wherein the actuator rod includes a cylindrical rod and ball return insert, the cylindrical rod includes a threaded portion that provides a helical race that receives a plurality of balls and is further formed to define a cutout that extends radially into the threaded portion, and the ball return insert is received in the cutout and configured to recirculate the plurality of balls in the helical race,
   wherein the ball return insert is formed to include threads and the threads of the ball return insert have a diameter that is less than a diameter of threads in the threaded portion of the actuator rod to cause a subset of the plurality of balls that are circumferentially and axially aligned with the ball return insert to be spaced apart radially from the ball screw nut.

2. The electric actuator of claim 1, wherein the housing assembly includes a case arranged around and coupled with the electric motor and a plurality of bushings engaged with the actuator rod and coupled with the case to facilitate translation of the actuator rod relative to the case and wherein the plurality of bushings includes a first bushing and a second bushing spaced apart axially from the first bushing to locate the second bushing axially between the first bushing and the ball screw nut such that the first bushing and the second bushing cooperate to provide the first fixed end moment of the actuator rod.

3. The electric actuator of claim 2, wherein the housing assembly further includes a bearing coupled with the case and with the ball screw nut such that the second bushing is located axially between the first bushing and the bearing.

4. An electric actuator for a steering system, the electric actuator comprising
   a linear actuation unit that includes an actuator rod that extends along an axis between a first end and a second end of the actuator rod and a ball screw nut arranged circumferentially around the actuator rod,
   an electric motor coupled with the ball screw nut and configured to rotate the ball screw nut about the axis and cause the actuator rod to translate axially relative to the ball screw nut, and
   a housing assembly arranged around and coupled with the electric motor and wherein the housing assembly provides a first fixed end moment of the actuator rod on a first side of the ball screw nut and a second fixed end moment of the actuator rod on a second side of the ball screw nut to minimize deflection of a portion of the actuator rod located within the ball screw nut,
   wherein the housing assembly includes a case arranged around and coupled with the electric motor and a plurality of bushings engaged with the actuator rod and coupled with the case to facilitate translation of the actuator rod relative to the case and wherein the plurality of bushings includes a first bushing and a second bushing spaced apart axially from the first bushing to locate the second bushing axially between the first bushing and the ball screw nut such that the first bushing and the second bushing cooperate to provide the first fixed end moment of the actuator rod,
   wherein the first bushing is entirely cylindrical and the second bushing has a cylindrical segment and a flange that extends radially away from the cylindrical segment and abuts an axial-facing surface of the case, the case includes a body arranged around the first bushing and the second bushing and a lip that extends radially inward from the body, and the lip is located axially between the first bushing and the second bushing and engages the first bushing to axially locate the first bushing.

5. The electric actuator of claim 4, wherein the actuator rod includes a cylindrical rod and ball return insert, the cylindrical rod includes a threaded portion that provides a helical race that receives a plurality of balls and is further formed to define a cutout that extends radially into the threaded portion, and the ball return insert is received in the cutout and configured to recirculate the plurality of balls in the helical race.

6. The electric actuator of claim 5, wherein the ball return insert is formed to include threads and the threads of the ball return insert have a diameter that is less than a diameter of threads in the threaded portion of the actuator rod to cause a subset of the plurality of balls that are circumferentially and axially aligned with the ball return insert to be spaced apart radially from the ball screw nut.

7. The electric actuator of claim 1, wherein the electric motor includes stator windings fixed to a case included in the housing assembly and permanent magnets coupled directly with the ball screw nut for rotation with the ball screw nut.

8. The electric actuator of claim 1, wherein the actuator rod has the threaded portion, a first unthreaded portion that extends axially away from the threaded portion, and a second unthreaded portion that extends axially away from the threaded portion opposite the first unthreaded portion and an outer surface of the actuator rod is provided with a continuous surface treatment that extends along the first unthreaded portion, the threaded portion, and the second unthreaded portion.

9. The electric actuator of claim 2, wherein the case is formed to define an annular channel that opens radially inward toward the ball screw nut, the case further includes a sensor located in the annular channel and configured to measure a rotational position of the ball screw nut, the sensor including a position target board coupled to the ball screw nut for rotation therewith and an arcuate sensor board coupled with the case and located adjacent the position target board such that the arcuate sensor board overlaps the position target board when viewed along the axis.

10. The electric actuator of claim 1, wherein the housing assembly includes a case having a body arranged around and coupled with the electric motor and a first stop flange configured to limit axial translation of the actuator rod, the body is formed to define a first opening, the actuator rod extends through the body such that the first end of the actuator rod extends out of the body through the first opening, and the first stop flange extends axially away from the body beyond the first opening and is configured to block the first end of the actuator rod from being pushed into the body in response to an external force being applied to the actuator rod.

11. The electric actuator of claim 10, wherein the body is formed to define a second opening spaced apart axially from the first opening, the second end of the actuator rod extends axially out of the body through the second opening, and the case includes a second stop flange that extends axially away from the body beyond the second opening.

12. The electric actuator of claim 10, wherein the case includes a second stop flange that extends axially away from the body beyond the first opening and the second stop flange is spaced apart circumferentially from the first stop flange.

13. The electric actuator of claim 4, wherein the electric motor includes stator windings fixed to the case included in the housing assembly and permanent magnets coupled directly with the ball screw nut for rotation with the ball screw nut.

14. The electric actuator of claim 4, wherein the actuator rod has a threaded portion, a first unthreaded portion that extends axially away from the threaded portion, and a second unthreaded portion that extends axially away from the threaded portion opposite the first unthreaded portion and an outer surface of the actuator rod is provided with a continuous surface treatment that extends along the first unthreaded portion, the threaded portion, and the second unthreaded portion.

15. The electric actuator of claim 4, wherein the case is formed to define an annular channel that opens radially inward toward the ball screw nut, the case further includes a sensor located in the annular channel and configured to measure a rotational position of the ball screw nut, the sensor including a position target board coupled to the ball screw nut for rotation therewith and an arcuate sensor board coupled with the case and located adjacent the position target board such that the arcuate sensor board overlaps the position target board when viewed along the axis.

16. The electric actuator of claim 4, wherein the housing assembly further includes a first stop flange configured to limit axial translation of the actuator rod, the body of the case is formed to define a first opening, the actuator rod extends through the body such that the first end of the actuator rod extends out of the body through the first opening, and the first stop flange extends axially away from the body beyond the first opening and is configured to block the first end of the actuator rod from being pushed into the body in response to an external force being applied to the actuator rod.

17. The electric actuator of claim 16, wherein the body is formed to define a second opening spaced apart axially from the first opening, the second end of the actuator rod extends axially out of the body through the second opening, and the case includes a second stop flange that extends axially away from the body beyond the second opening.

18. The electric actuator of claim 16, wherein the case includes a second stop flange that extends axially away from the body beyond the first opening and the second stop flange is spaced apart circumferentially from the first stop flange.

* * * * *